Feb. 20, 1945. A. E. RUTTER 2,369,984
PLOW HITCH
Filed Feb. 27, 1942 2 Sheets-Sheet 1

INVENTOR
Alvah E. Rutter,
BY
Emerson B. Donnell
ATTORNEY

Feb. 20, 1945. A. E. RUTTER 2,369,984
PLOW HITCH
Filed Feb. 27, 1942 2 Sheets-Sheet 2

INVENTOR
Alvah E. Rutter
BY
Emerson B. Donnell
ATTORNEY

Patented Feb. 20, 1945

2,369,984

UNITED STATES PATENT OFFICE 2,369,984

PLOW HITCH

Alvah E. Rutter, Rockford, Ill., assignor to J. I. Case Company, Racine, Wis., a corporation Application February 27, 1942, Serial No. 432,665

3 Claims. (Cl. 97—98)

The present invention relates to plow hitches and an object thereof is to generally improve the construction and operation of devices of this class.

More specifically an object is to provide a hitch for a wheel plow for connecting the same to a tractor or other propelling device and which will allow vertical or up-and-down pivotal movement between the hitch and the plow.

An important object of the invention is to provide such a hitch which will yieldably resist such pivotal movement.

A further object is to utilize rubber or flexible resilient material to accomplish this result in a plow hitch.

Further objects and advantages will become apparent from the following specification and annexed drawings in which.

Plows for certain conditions are customarily organized with one or more beams forming a frame or frame-like structure carried by wheels, the frame being mounted on one or more axles connected with and supported by the wheels. One end of the frame is pivotally connected to a hitch device, which is in turn connected to the tractor, and at the opposite end the frame terminates in the customary plow bottom or bottoms which engage the ground. Power lift means is ordinarily provided for raising and lowering the plow axle relatively to the ground with the object of raising the frame and accordingly lifting the plow bottoms clear of the ground for transport purposes. Difficulty has been experienced in such an arrangement due to the substantial weight of the plow bottoms at the rear portion of the frame and the pivotal connection of the hitch element with the front of the frame. The frame is in effect rockably mounted on the axle and when the axle rises, instead of raising the plow bottoms, the tendency is to pivot the hitch in the manner of a link about the tractor draw bar and also about the pivotal connection between the hitch and the plow frame. Thus the front end of the frame rises upon actuation of the power lift and the plows remain in the ground.

Heretofore, similar arrangements, such for example as furrow wheels arranged to be shifted by the power lift have been employed to overcome this difficulty.

It is desirable that the front end of the plow frame be relatively free for limited up-and-down movement when the plows are operating, after the manner of a walking plow, and this is the reason for the introduction of a pivotal connection between the frame or beams and the plow hitch. In the present instance the difficulty is overcome by the introduction of a yielding resistance to pivotal movement between the plow hitch and the beams so that the front of the frame may not rise materially when the power lift operates whereupon the frame must rise bodily and the plow bottoms are lifted clear of the ground.

A further advantage results from the yielding resistance in that the frame may not freely pivot about the pivotal connection of the plow hitch to allow the front of the frame to go down in the event that the plow bottoms tend to rise when operating in hard ground or under other adverse conditions. The yielding resistance therefore acts to improve the action of the plows under some conditions and the lifting and transport of the plows under all conditions, no special complications being necessary to provide for a proper transport condition.

Figure 1:
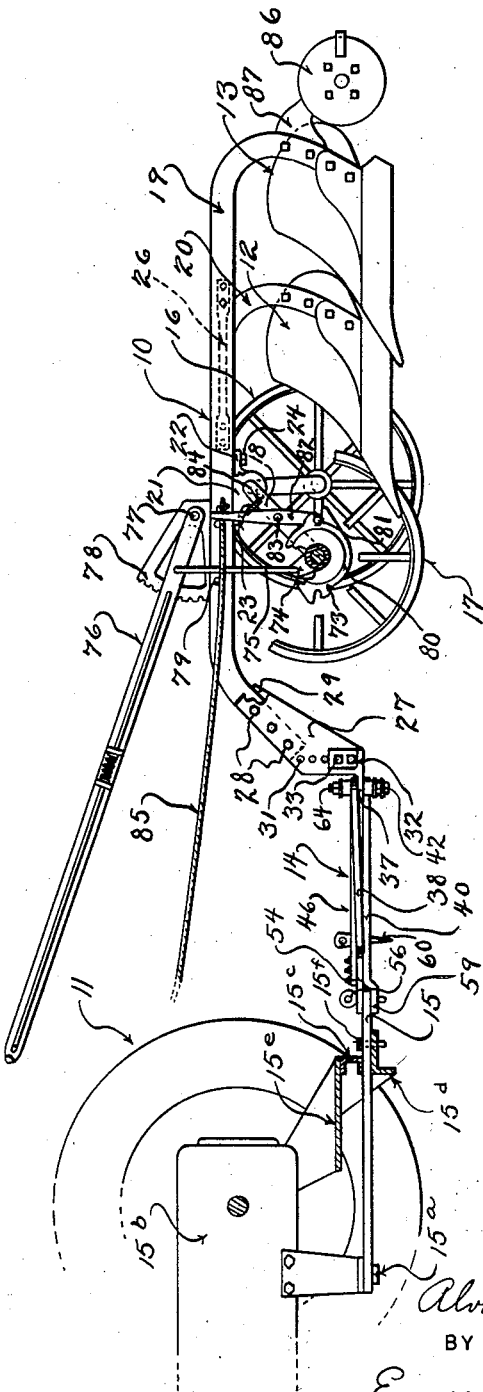
Figure 1 is a left side elevation of a plow with parts broken away and including the invention.

As seen in Fig. 1, the plow frame generally designated as 10 is drawn by a tractor generally designated as 11 and has a plurality of bottoms 12 and 13 and a hitch generally designated as 14, hitch 14 connecting with the draw bar 15 of tractor 11. The tractor draw bar may be of any suitable construction, in the present instance draw bar 15 being pivotally attached at 15ª to the transmission portion 15ᵇ of the tractor and being prevented from moving up or down appreciably by guides 15ᶜ and 15ᵈ carried by the tractor platform 15ᵉ. A pin 15ᶠ may be inserted in aligned openings in draw bar 15 and guide 15ᵈ to prevent lateral swinging movement of draw bar 15 under conditions where such swinging movement is not desirable. Tractor 11 forming no part of the present invention will not be further shown or described.

In the present instance the plow includes wheels 16 and 17, an axle 18, and a plurality of beams 19 and 20 supported on axle 18 by means of bearings 21 and 22 fixed to beams 19 and 20 respectively as by bolts or the like 23 and 24. Beams 19 and 20 are united at their forward ends by a cross-member 25, Fig. 2, and a cross member 26 is provided to unite beams 19 and 20 into a unitary frame-like member, heretofore designated as 10.

Figure 2:
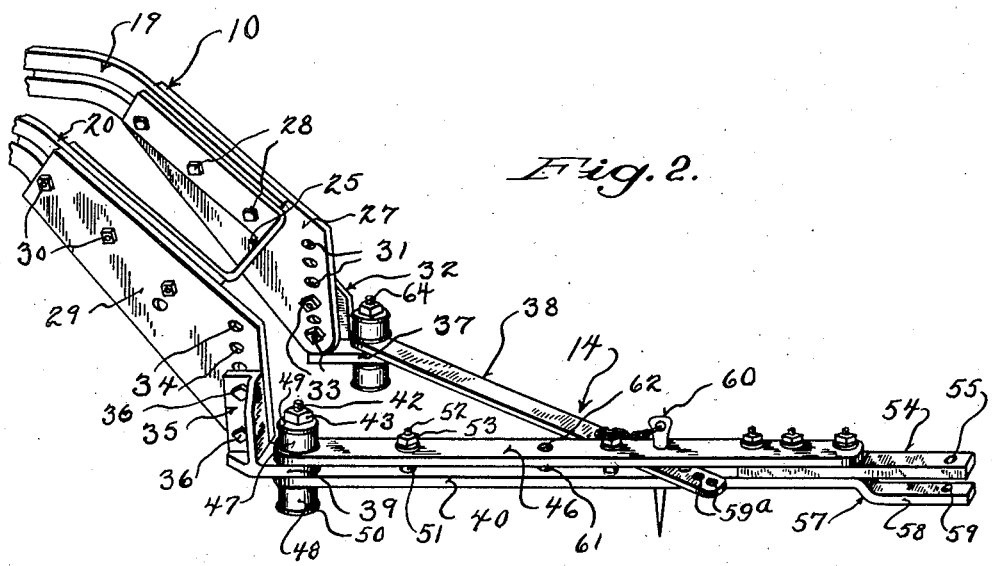
Fig. 2 is a perspective view of the hitch alone.

Beam 19 has a plate element 27 fixed therewith at the forward end as by bolts 28—28 and beam 20 has a plate element 29 fixed therewith in a similar manner as by bolts 30—30. Plates 27 and 29 form the attaching means for the hitch as will appear, although it is to be understood that the invention is not limited to the use of plates or any other specific details, except as defined in the claims. Plate 27 as more particularly shown in Fig. 2 is thus provided with a plurality of holes 31—31 and has a fitting generally designated as 32 fixed thereto as by bolts 33—33. In similar manner plate 29 has holes 34—34 and has fixed thereto a fitting generally designated as 35 by bolts 36—36. Fittings 32 and 35 may accordingly be raised and lowered as necessary to adjust the hitch point to the proper height for plowing under various conditions. Fitting 32 has a forwardly extending ear 37 to which is attached a hitch element 38 in a manner to be more fully described. Fitting 35 has a forwardly extending ear 39 to which is attached a hitch element 40 to be presently described. Ears 37 and 39 extend in a substantially horizontal position.

Figures 3, 4:
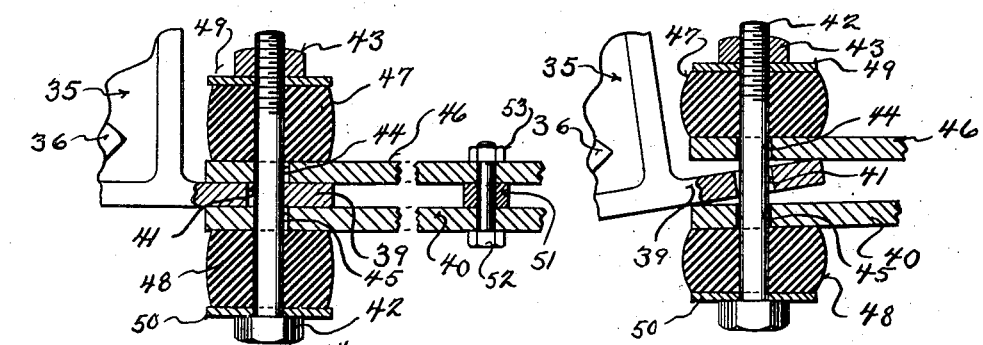
Fig. 3 is a vertical axial sectional view of an attaching means indicated in the other figures.
Fig. 4 is a similar view showing the parts in a different position.

Referring now to Fig. 3, fitting 35 is provided with above mentioned ear 39 and which has an opening 41 through which passes a bolt 42 having a nut 43. Bolt 42 passes through apertures 44 and 45 respectively in hitch elements 40 and 46, disposed on either side of ear 39, the pull on members 46 and 40 being transmitted to ear 39 by a shearing stress on bolt 42. Aperture 41 and openings 44 and 45 or any of them are formed with substantial freedom for passage of bolt 42 so as to allow up-and-down pivotal movement between ear 39 and members 40 and 46.

A block of rubber, rubber-like material, or other flexible resilient material 47 in the present instance is disposed above element 46 and a block of similar material 48 is disposed below member 40. A washer 49 is preferably interposed between block 47 and nut 43 and a washer 50 is interposed between block 48 and the head of bolt 42. Any other equivalent means to washers 49 and 50 is contemplated for avoiding damage to blocks 47 and 48 by the nut and head of bolt 42. In practice nut 42 is tightened until blocks 47 and 48 are put in compression, the degree of compression being determined by the desired stiffness of the hitch. Lacking any tendency toward pivotal movement, elements 46 and 40 will remain in line with ear 39, being tightly urged thereagainst by the compressive force of blocks 47 and 48. However, upon substantial tilting force being exerted on ear 39, the ear may yield as shown in Fig. 4 with a consequent spreading apart of elements 46 and 40, resulting in further compression of blocks 47 and 48. The expansive pressure of said blocks will tend to restore ear 39 to a horizontal condition, or at any rate to a position in line with elements 46 and 40.

Elements 46 and 40 are spaced by ferrules or the like 51 through which pass bolts 52, tightening elements 40 and 46 against the ferrules by means of nuts such for example as 53. Tilting movement of ear 39 requires separation of elements 40 and 46 and such tilting is further resisted by the stiffness of elements 40 and 46, since they are maintained at a fixed distance from each other at a point a short distance from ear 39 as indicated in Fig. 2.

Elements 40 and 46 extend forwardly and receive between them a tongue member 54 having an opening 55 for receiving a draw pin 56 (Fig. 1) for coupling the hitch to tractor 11. Member 40 in the present instance is offset at 57 to provide a portion 58 which may extend beneath above mentioned draw bar 15 to prevent upward movement of this end of hitch 14. Portion 58 is provided with an opening 59 through which extends above mentioned pin 56. Other arrangements for connecting draw bar 15 and hitch 14 to prevent relative up-and-down movement are contemplated as equivalent.

As so far described, it will be apparent that a plow hitch has been devised which will connect with a tractor and, while allowing slight up-and-down pivotal movement at bolt 42, will resist appreciable movement at this point with substantial force, and always tend to return the hitch and frame to predetermined relative position.

As will now be apparent, if different conditions require different degrees of resistance, this may be secured by adjusting nut 43 to give greater or less compression in blocks 47 and 48. If it is desired to raise or lower the hitch point, bolts 36—36 may be removed and replaced in different holes 34—34.

Above mentioned hitch element 38 extends diagonally from ear 37 in the present instance entering between hitch elements 40 and 46. Element 38 is provided with a series of holes 59a—59a, any one of which may be engaged by a pin 60 traversing suitable holes in members 46 and 40, as for example 61 and 62. Element 38 is attached to ear 37 in a manner similar to that described in connection with ear 39 and accordingly acts to determine the lateral position of hitch elements 46 and 40 relative to frame 10. By withdrawing pin 60, the lateral position of the several hitch elements may be changed and pin 60 replaced in different holes to maintain the new adjusted position.

Figure 5:
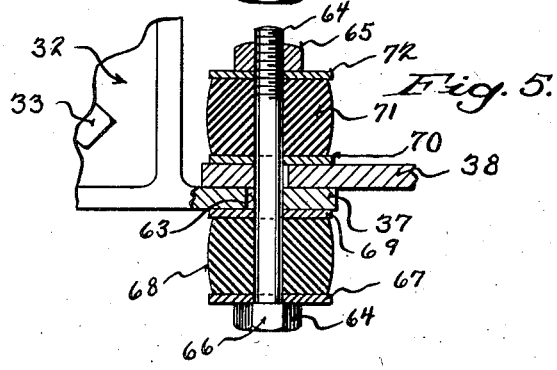
Fig. 5 is a view similar to Fig. 3, of another attaching means indicated in Fig. 2.

In the case of element 38 a slightly different arrangement is used for connection to ear 37, as shown in Fig. 5. Ear 37 has an opening 63 through which passes a bolt 64 having a nut 65 and a head 66. Bolt 64 also traverses element 38 which in the present instance rests on top of ear 37, and transmits the pull from element 38 to ear 37 by a shearing stress on the bolt. Beneath ear 37 a washer or the like 67 rests on head 66 and carries a block 68 of rubber or like material similar to above mentioned blocks 47 and 48. A washer 69 is interposed between block 68 and ear 37. Above element 38, a washer 70 is arranged between element 38 and a block 71 of rubber or like material, a washer 72 being interposed between block 71 and above mentioned nut 65. Nut 65 may be adjusted to compress blocks 68 and 71 and which will yieldingly maintain element 38 in line with ear 37 as will be apparent. The dimensions of the parts are so chosen that the desired "stiffness" of the hitch may be readily obtained by suitable adjustment of nuts 43 and 65. Washers 69 and 70 may be omitted within the contemplation of the invention, and, on the other hand similar washers may be introduced between blocks 47, 48 and elements 46 and 40 respectively, without departing from the spirit and scope of the invention. Other suitable or well-known expedients may be employed for preventing damage to blocks 68 and 71.

In operation (see also Fig. 1), tractor 11 draws plow 10 through hitch member 14, composed of the several elements 38, 40 and 46, bolts 42 and 64 transmitting the pull to fittings 32 and 35, and so to beams 19 and 20, comprising the frame 10 of the plow. In the event that plow bottoms 12 and 13 encounter a hard spot, there will be a tendency for them to rise, tilting frame 10 about axle 18 and depressing plates 27 and 29 and accordingly the hitch point or bolts 42 and 64. This movement will be resisted as above outlined by the compression of the rubber or similar blocks 47, 48, 68 and 71. Also, because of the inherent damping effect or "mechanical hysteresis" of rubber and such material, vibration or jumping of the hitch point is effectively minimized.

Axle 18 has journaled thereon a power lift clutch generally designated as 73, the details of which are well-known but which has a crank arm 74 pivotally connected by a link 75 of suitable or well-known construction with an adjusting lever 76. Lever 76 is fulcrumed at 77 to a quadrant or adjusting plate 78 fixed as by bolts 79 in the present instance with beam 19. Clutch 73 also includes a cam plate 80 engaged by a detent 81 carried on a lever 82 fulcrumed at 83 in the present instance on axle 18. Clutches of this general type being well-known, it is unnecessary to describe the details further. Lever 82 is urged in a clock-wise direction, as seen in Fig. 1, by means of a spring 84, and a rope or other connection 85 extends to a convenient point on tractor 11 for operation by the driver of the tractor. A pull on rope 85 disengages detent 81, causing cam plate 80 and crank arm 74 to be rotated by wheel 17 through one-half of a revolution in well-known manner. This allows frame 10 and its attached parts, which are supported in part by means of link 75, to drop to the extent of twice the throw of crank arm 74 with relative upward rocking of axle 18. This permits plows 12 and 13 to enter the ground. Another pull on rope 85 causes crank arm 74 to describe another half revolution whereupon frame 10 is raised.

Owing to the considerable weight of plow bottoms 12 and 13, this action tends to rock frame 10 in a clock-wise direction about axle 18 with pivotal movement at bolts 42 and 64. Pivotal movement would also take place at draw pin 56 in view of the freedom customarily permitted at joints of this character. In the present instance such clock-wise rocking of frame 10 is prevented or at least minimized by the resistance to rocking characteristic of the connections established by bolts 42 and 64, and these are adjusted so that any pivotal movement at this point will not be sufficient to allow excessive clock-wise movement of frame 10. Since draw bar 15 is prevented from moving up and down, the height of the front end of hitch 14 is predetermined and no difficulty is experienced in successfully lifting plow bottoms 12 and 13 when power lift clutch 73 is operated.

A tail or furrow wheel generally designated as 86 is suitably journaled on a bracket 87 fixed to beam 19, the furrow wheel being also lifted clear of the ground when power lift 73 is operated. As will be apparent, it is not necessary to provide for any adjustment of furrow wheel 86 to be caused by the power lift, the wheel functioning merely when the plows are in the ground to take certain of the plowing reactions in well-known manner.

The above being a complete description of an illustrative embodiment of the invention, what is claimed as new and desired to be secured by Letters Patent of the United States is:

1. In a wheel plow, a frame including a longitudinally disposed beam, an apertured ear extending forwardly from said frame in a substantially horizontal position, a bolt extending through the aperture of said ear in a substantially vertical position and having thereon in the order named a substantially rigid washer, a block of flexible elastic material, a hitch element, said ear, a second hitch element, a block of flexible elastic material, and a substantially rigid washer, said bolt being arranged to be tightened in order to compress said blocks and cause them to yieldingly maintain said hitch elements in line with said ear.

2. In a wheel plow, a frame including a longitudinally disposed beam, an apertured ear extending forwardly from said frame in a substantially horizontal position, a bolt extending through the aperture of said ear in a substantially vertical position and having thereon, in the order named, a substantially rigid washer, a block of flexible elastic material, said ear, a hitch element, a block of flexible elastic material, and a substantially rigid washer, said bolt being arranged to be tightened in order to compress said blocks and cause them to yieldingly maintain said hitch element in line with said ear.

3. A hitch for connecting to a plow beam and swingable in a substantially horizontal plane and a connection including a pivot bolt transverse to the plane of swinging of said hitch, an ear on said beam, said pivot bolt traversing said ear and hitch, and a block of resilient material on said bolt in position to be compressed and to force said ear and said hitch yieldably into contact with each other to yieldingly resist pivotal up-and-down movement by deformation of said resilient material.

ALVAH E. RUTTER.